(12) United States Patent
Zaleski, Jr. et al.

(10) Patent No.: US 10,980,243 B2
(45) Date of Patent: Apr. 20, 2021

(54) ROTATING BRAID-HEAD NOZZLE ASSEMBLY

(71) Applicant: Reading Bakery Systems, Inc., Robesonia, PA (US)

(72) Inventors: Joseph S. Zaleski, Jr., Mohrsville, PA (US); Steven Shepler, Myerstown, PA (US); Jeffrey L. Hardick, Bernville, PA (US)

(73) Assignee: READING BAKERY SYSTEMS, INC., Robesonia, PA (US)

( * ) Notice: Subject to any disclaimer, the term of this patent is extended or adjusted under 35 U.S.C. 154(b) by 406 days.

(21) Appl. No.: 16/026,374

(22) Filed: Jul. 3, 2018

(65) Prior Publication Data

US 2020/0008432 A1 Jan. 9, 2020

(51) Int. Cl.
| | |
|---|---|
| *A21C 3/08* | (2006.01) |
| *B29C 48/30* | (2019.01) |
| *A21C 3/04* | (2006.01) |
| *A23P 30/20* | (2016.01) |
| *A21C 11/16* | (2006.01) |
| *B29C 48/33* | (2019.01) |

(52) U.S. Cl.
CPC .................. *A21C 3/08* (2013.01); *A21C 3/04* (2013.01); *A21C 11/16* (2013.01); *A23P 30/20* (2016.08); *B29C 48/30* (2019.02); *B29C 48/33* (2019.02)

(58) Field of Classification Search
CPC ... A21C 3/08; A21C 3/04; A21C 11/16; A23P 30/20; B29C 48/33; B29C 48/30
See application file for complete search history.

(56) References Cited

U.S. PATENT DOCUMENTS

| 6,450,796 B1 | 9/2002 | Groff et al. |
| 2016/0113293 A1 | 4/2016 | Zaleski, Jr. et al. |

*Primary Examiner* — Joseph S Del Sole
*Assistant Examiner* — John Robitaille
(74) *Attorney, Agent, or Firm* — Panitch Schwarze Belisario & Nadel LLP

(57) ABSTRACT

A rotating nozzle assembly for a die machine connectable to a dough extruder has a stationary sleeve with a first end having internal and external annular recesses and an annular stepped seating surface and a second end mountable in the die machine mounting plate. A nozzle has a first end rotatably disposed in the stationary-sleeve first-end internal annular recess, a second end and a radially outwardly-protruding annular ring between the first and second nozzle ends. A ring seal is disposed between the stationary-sleeve first-end annular stepped seating surface and the radially outwardly-protruding annular nozzle ring. A nozzle cap is fixedly attached to the stationary-sleeve first end. The nozzle is rotatably disposed in the nozzle cap. The nozzle second end extends beyond the nozzle cap. An annular stepped axial thrust bearing surface in the nozzle cap prevents relative axial movement of the nozzle while allowing rotation of the nozzle.

10 Claims, 5 Drawing Sheets

ROTATING BRAID-HEAD NOZZLE ASSEMBLY

BACKGROUND OF THE INVENTION

The present invention relates to a rotating braid-head nozzle assembly for a die machine used in conjunction with a dough extruder for producing a twisted dough product. More particularly, the invention relates to a rotating braid-head nozzle for extruding dough through at least two openings with the rotatable nozzle twisting the dough together to form a twisted dough product having qualities similar to a conventional laminated dough product, such as a cracker.

Extrusion die machines used to form spiral wound pretzel dough products typically utilize rotary nozzles, each having at least one opening through which dough is extruded as the nozzle rotates. The desired pitch of the spiral wound dough product is dependent upon the vertical distance from the extrusion head to the conveyor belt and the speed of the conveyor belt or nozzle speed. A pressure of at least 40-80 psi is generally required in order to force the dough through the extrusion head and out through the opening(s) in the rotating nozzle.

The sealing of the dough from the rotary mechanisms within the die plate of such machines is critical to creating a machine that is both sanitary and capable of operating substantially continuously without significant operator intervention. Standard sealing methods, such as those employed in the prior art apparatus, are susceptible to the abrasiveness of the dough and the high pressures necessary to extrude the dough. Such conventional sealing arrangements often fail prematurely and do not work well due to the high viscosity of the dough and the need to have all of the seals and all other "wetted" parts sanitary in their construction, which is required by the food processing industry. The mechanical seal arrangement in the prior apparatus which was intended to prevent dough from entering the bearings that support the rotating nozzles often fail after a relatively short period of use, requiring the entire extrusion head to be disassembled, cleaned and rebuilt. This involves a time consuming tear down of the equipment during which time the production line is idled.

It would be desirable to provide an extrusion die apparatus having at least two rotating nozzles with a streamlined arrangement to allow extrusion of dough at lower pressures. It would also be desirable to provide an improved sealing arrangement in such an apparatus to prevent the migration of dough into the bearings or other components which support the rotating nozzles in order to diminish or eliminate the need for time consuming tear downs of the rotary nozzle extrusion die for clean out and rebuilding upon seal failure.

BRIEF SUMMARY OF THE INVENTION

Briefly stated, one embodiment of the present invention is directed to a rotating nozzle assembly for a die machine used in conjunction with a dough extruder. The die machine has a nozzle mounting plate. The nozzle assembly comprises a stationary sleeve having a stationary-sleeve first end with a stationary-sleeve first-end internal annular recess, a stationary-sleeve first-end external annular recess, a stationary-sleeve first-end annular stepped seating surface and a stationary-sleeve second end mountable in the die machine mounting plate. A nozzle has a nozzle first end and a nozzle second end. A radially outwardly-protruding annular nozzle ring is between the nozzle first end and the nozzle second end. The nozzle second end is rotatably disposed in the stationary-sleeve first-end internal annular recess. A ring seal is disposed between the stationary-sleeve first-end annular stepped seating surface and the radially outwardly-protruding annular nozzle ring. A nozzle cap has a nozzle-cap first and a nozzle-cap second end. The nozzle cap is fixedly attached to the stationary-sleeve first end. The nozzle is rotatably disposed in the nozzle cap. The nozzle second end extends beyond the nozzle cap. An annular stepped axial thrust bearing surface in the nozzle cap prevents relative axial movement of the nozzle while allowing rotation of the nozzle.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
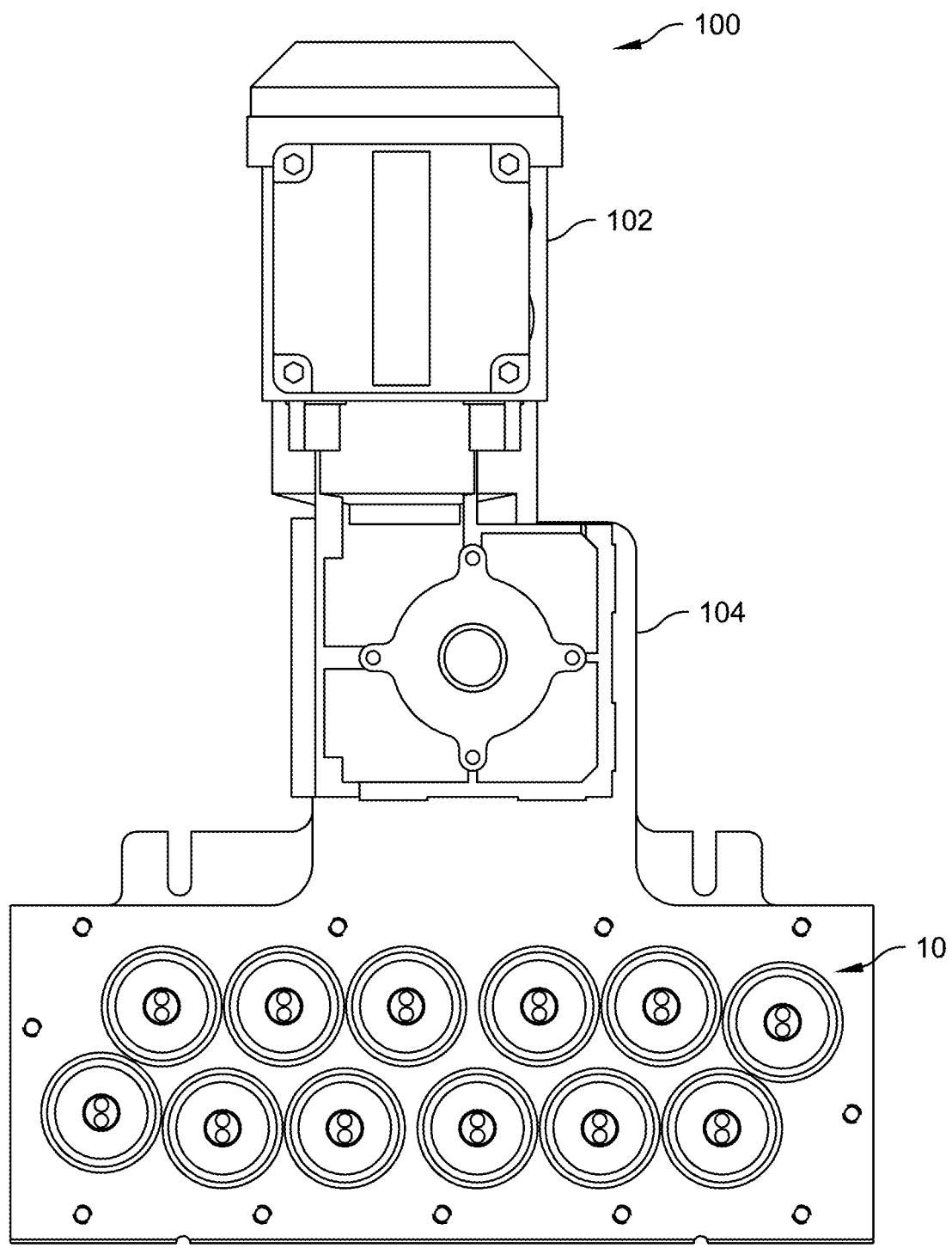
FIG. 1 is a front elevational view of an extruder die machine having a plurality of rotating nozzle assemblies arranged therein in accordance with a preferred embodiment of the present invention.

Certain terminology is used in the following description for convenience only and is not limiting. The words "right," "left," "lower" and "upper" designate directions in the drawings to which the reference is made. The words "inwardly" and "outwardly" refer to directions toward and away from, respectively, the geometric center of the rotary nozzle die machine in accordance with the present invention and designated parts thereof. The terminology includes the words above specifically mentioned, derivatives thereof and words of similar import.

Referring to the drawings in detail, where like numerals indicate like elements throughout, there is shown in FIGS. 1-6 an exemplary rotary nozzle extruder die machine, generally designated 100 and hereafter referred to as the "die machine" 100, having at least one rotating nozzle assembly, generally designated 10 and hereafter referred to as the nozzle assembly 10 in accordance with a preferred embodiment of the present invention. Preferably, but not necessarily, the die machine 100 is for use in conjunction with a dough extruder as further disclosed hereafter.

Figure 2:
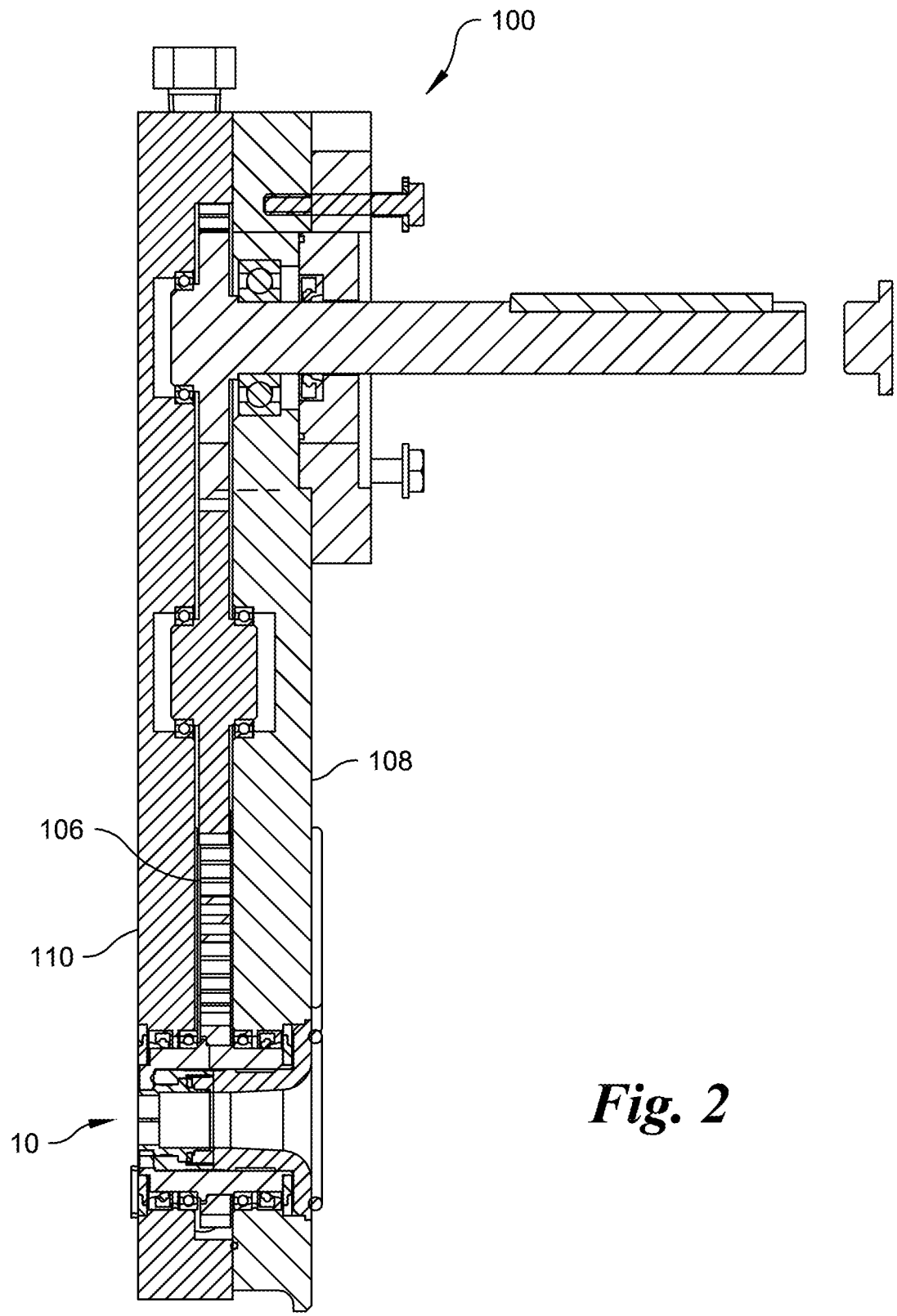
FIG. 2 is a cross-sectional elevational view of the extruder die machine of FIG. 1.

As shown in FIGS. 1 and 2, in a preferred embodiment of the die machine 100, four to eighteen offset rotating nozzle assemblies 10 are provided in order to allow the simultaneous extrusion of twelve streams of dough, each including a plurality of spirally wound or twisted strands. The nozzle assemblies 10 are all rotated by a single drive system comprising a motor 102, preferably a controllable variable speed electric motor, which is connected by a shaft (not shown) to a gear assembly 104 that intermeshes with two separate gear trains of intermeshing nozzle drive gears 106 each of which in turn rotates an individual rotating nozzle assembly 10. Those skilled in the art will recognize from the present disclosure that various numbers and configurations of rotating nozzle assemblies 10 can be utilized, if desired, and the drive train may be varied to employ any suitable arrangement of gears, toothed belts and pulleys or other suitable drive means for the purpose of causing one or more of the individual nozzle assemblies 10 to rotate at a desired speed to provide the twisted dough strands.

Figure 3:
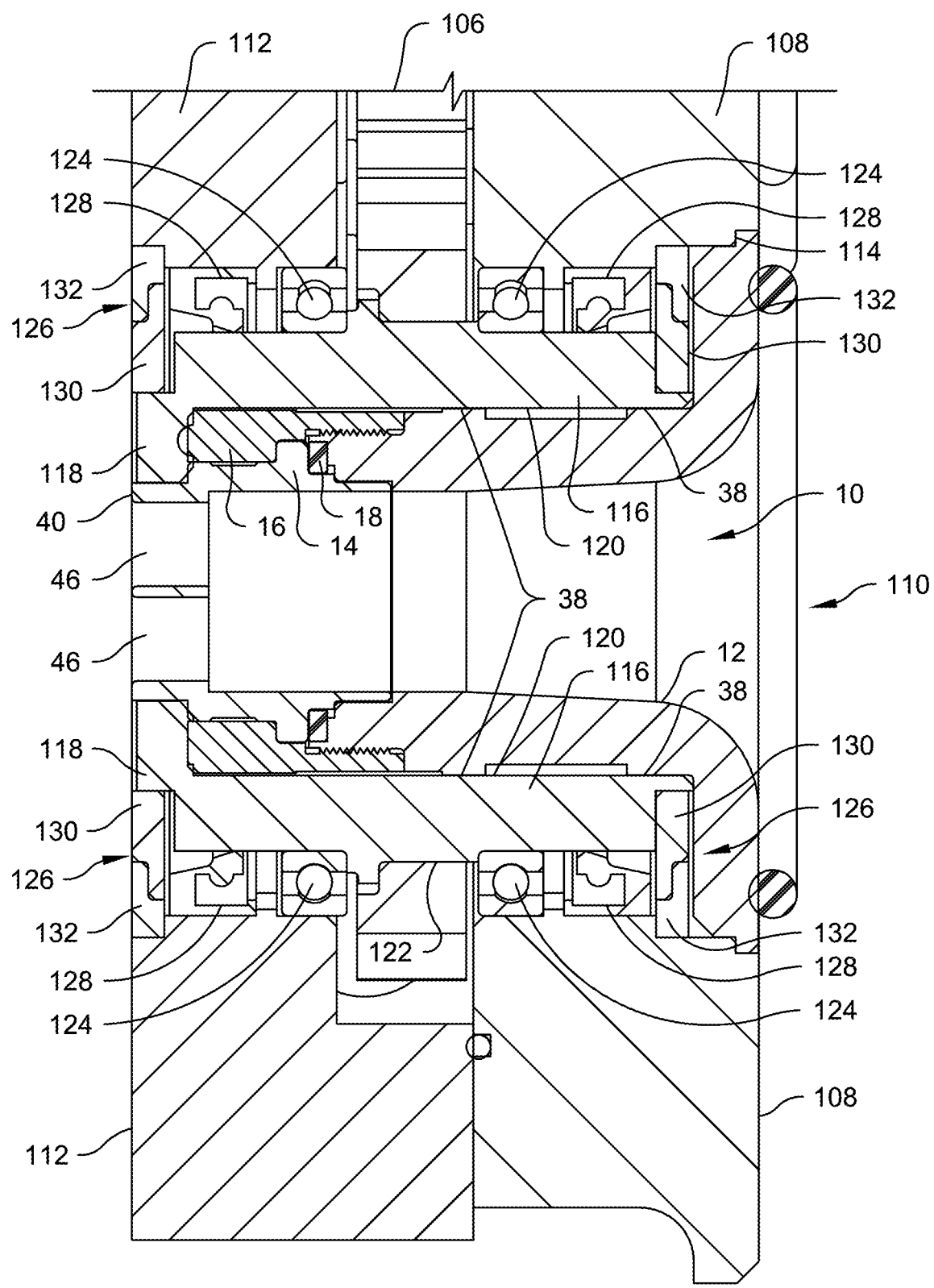
FIG. 3 is an enlarged cross-sectional elevational view of a portion of the extruder die machine of FIG. 2.
Figure 4:
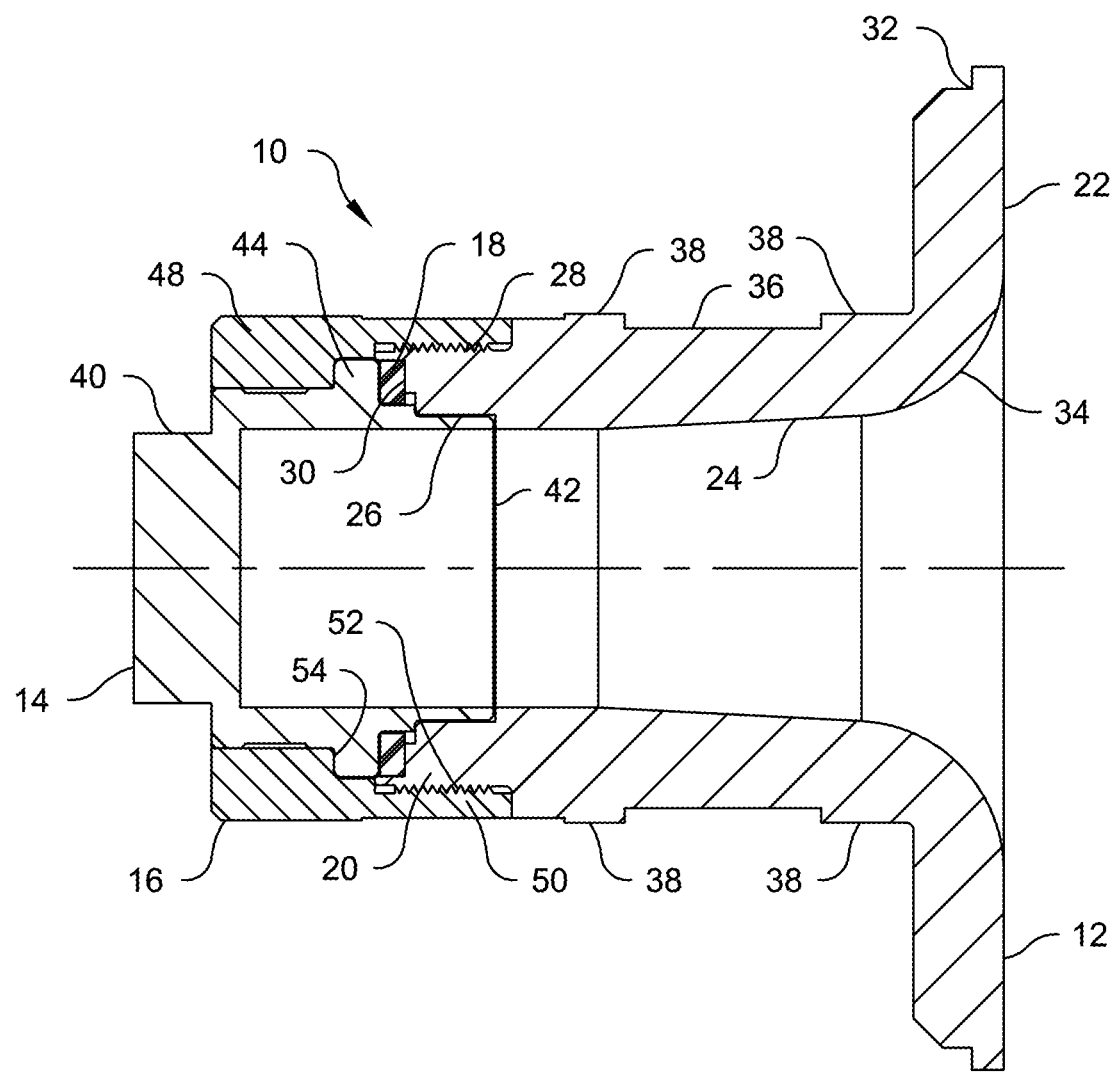
FIG. 4 is an enlarged cross-sectional elevational view of the rotating nozzle assembly of FIG. 3.
Figure 5:
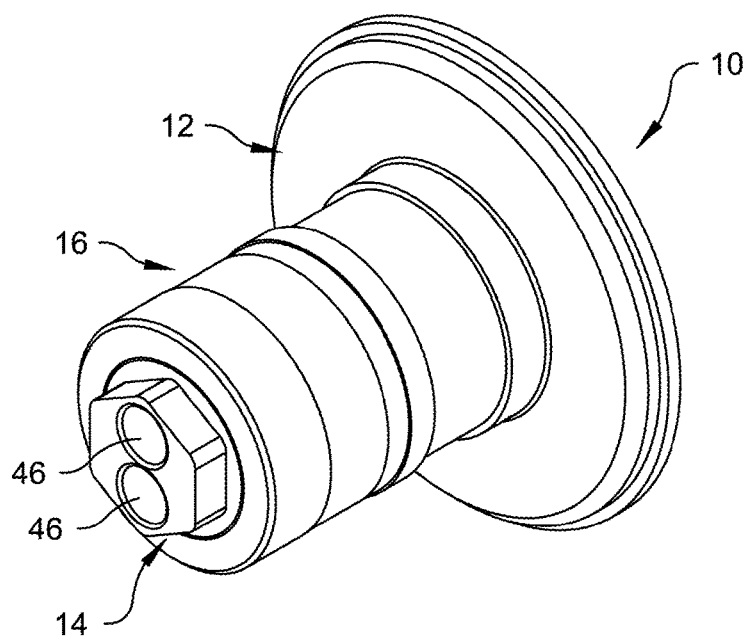
FIG. 5 is an isometric view of the rotating nozzle assembly of FIG. 2.
Figure 6:
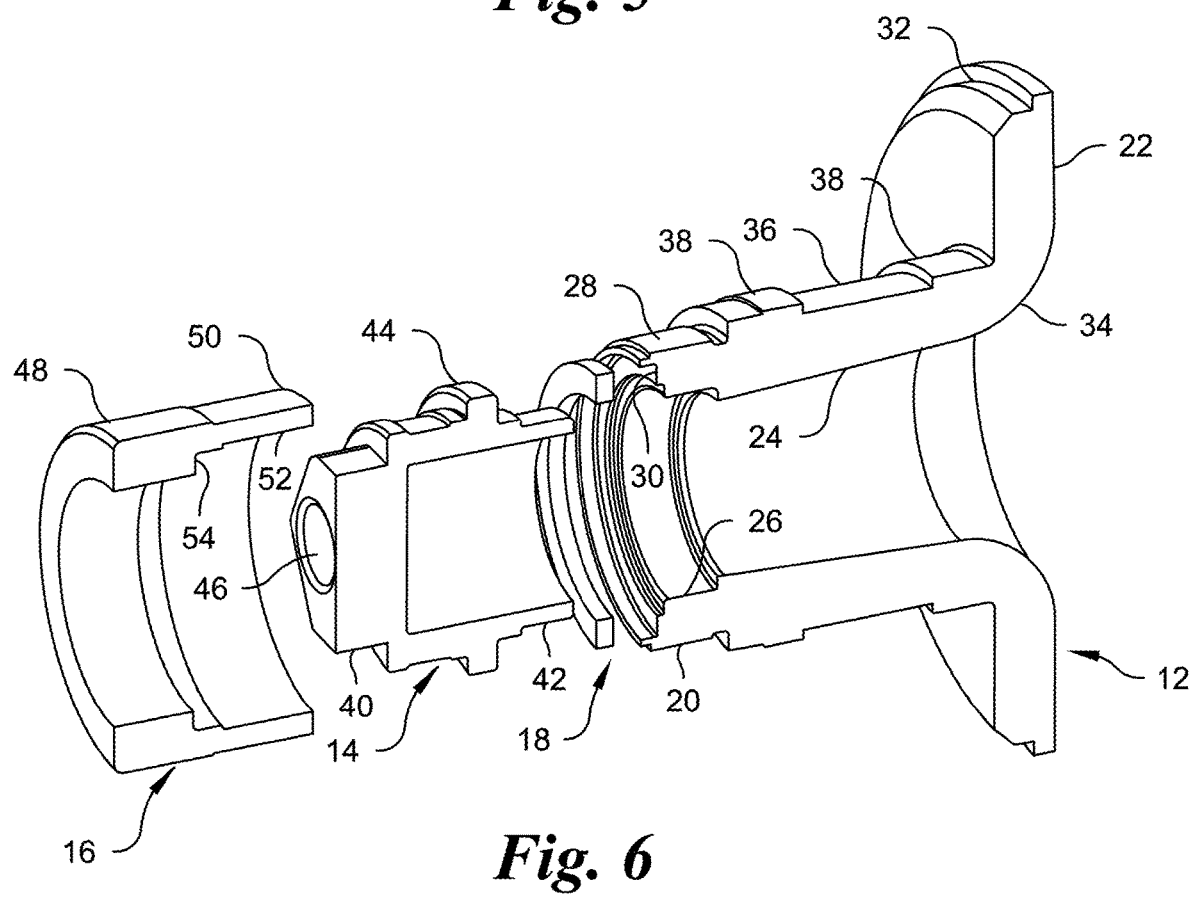
FIG. 6 is an exploded cross-sectional side elevational view in perspective of the rotating nozzle assembly of FIG. 5.

The die machine 100 is preferably used in conjunction with an extruder (not shown), such as a dough forming extruder which is available from Reading Bakery Systems, the assignee of the present invention. Generally, in the extruder, dough is carried by one or more augers from a feed hopper to a compression head which channels dough from the extruder to a machined mounting plate 108 of the die machine 100. The mounting plate 108 may have a plurality of mounting plate openings 110 (only one of which is shown in FIG. 3) of various sizes and spacings depending on the configuration of the nozzle assemblies 10 and the desired product. An outer cover plate 112 is provided on the outer surface of the die machine 100. The mounting plate 108 and the outer cover plate 112 together form a housing for receiving and retaining the rotating nozzle assemblies 10 and other components of the die machine 100 as are hereinafter described.

As shown in detail in FIGS. 3-6, in a preferred embodiment, each rotating nozzle assembly 10 comprises a stationary sleeve 12, a nozzle 14, a nozzle cap 16, and a ring seal 18. The stationary sleeve 12 has a stationary-sleeve first end 20 and a stationary-sleeve second end 22. A generally tubular stationary-sleeve bore 24 extends the length of the stationary sleeve 12 between the stationary-sleeve first end 20 and a stationary-sleeve second end 22. The stationary-sleeve first end 20 has a stationary-sleeve first-end internal annular recess 26 which engages a corresponding portion of the nozzle 14 as disclosed hereafter, a stationary-sleeve first-end external annular recess 28 which engages the nozzle cap 16 as further disclosed hereafter and a stationary-sleeve first-end annular stepped seating surface 30 which engages the seal ring 18 as also further disclosed hereafter.

The stationary-sleeve second end 22 is mountable in the die machine mounting plate 108. Preferably, the stationary-sleeve second end 22 has a stationary-sleeve second-end annular stepped seating surface 32 which is engagable with a corresponding mounting-plate annular stepped recess 114 that securely attaches the stationary sleeve 12 to the mounting plate 108 when the stationary-sleeve second end 22 is pressed into the mounting plate opening 110. The stationary-sleeve second end 22 also may includes a stationary-sleeve infeed cone 34 for receiving a flow of dough from the extruder. The stationary-sleeve infeed cone 34 and the tubular stationary-sleeve bore 24 may preferably be designed to reduce pressure and friction which could cause damage to certain types of dough structure. In some embodiments, the stationary-sleeve 12 has a stationary-sleeve outer surface 36 having spaced-apart radially outwardly-protruding annular stationary-sleeve ridges 38.

Dough flows through the nozzle assemblies 10 due to pressure. The pressure must be high enough to force the dough through the nozzle opening(s) 46, but low enough to protect the gluten structure within the dough from the altering forces of high pressure. In order to force the dough through the nozzle assemblies 10, a minimum pressure of about 20-30 psi is required utilizing the present rotary nozzle die machine 100. The prior known design required a pressure of over 100 psi which made the gluten structure of grain-based dough susceptible to damage. Some doughs, such as corn or potato-based dough, can withstand high pressures of 200 psi or higher. Accordingly, the nozzle assemblies 10, while operable at pressures as low as 20 psi, must also be able to withstand higher pressures of up to 250 psi depending upon the dough being used. However, for grain-based dough, operation at pressures of 80 psi or lower are preferred and attainable utilizing the present rotary nozzle die machine 100.

When dough starts to flow, the pressure is decreased because the flow has some inertia. The required pressure to push flowing dough is much less than the static pressure to start the dough moving. Accordingly, the nozzle assemblies 10 and the path from the extruder to the nozzle opening(s) 46 should be as streamlined as possible in order to keep the pressure low to avoid adversely affecting the dough by breaking down the gluten structure. The elimination of directional changes and interfering surfaces is therefore critical to achieving lower pressure extrusion. If the directional changes are significant, the velocity pressure and inertia forces of the dough are lost.

The nozzle 14 has a nozzle first end 40 and a nozzle second end 42. A radially outwardly-protruding annular nozzle ring 44 is positioned between the nozzle first end 40 and the nozzle second end 42. The nozzle first end preferably has at least two circular nozzle openings 46. The nozzle second end 42 is rotatably disposed in the stationary-sleeve first-end internal annular recess 26. The ring seal 18 is disposed between the stationary-sleeve first-end annular stepped seating surface 30 and the radially outwardly-protruding annular nozzle ring 44.

The nozzle cap 16 has a nozzle-cap first end 48 and a nozzle-cap second end 50. The nozzle-cap second end 50 has a nozzle-cap second-end internal annular recess 52 within which the stationary-sleeve first-end external annular recess 28 is received and may be fixedly attached thereto preferably by a threaded connection therebetween preferably but not neesarily in combination with an adhesive. The nozzle 14 is rotatably disposed in the nozzle cap 16 such that the nozzle first end 40 extends beyond the nozzle-cap first end 48. An annular stepped axial thrust bearing surface 54 in the nozzle cap 16 adjacent and opposed to the outwardly-protruding annular nozzle ring 44 prevents relative axial movement of the nozzle 14 while allowing rotation of the nozzle 14.

Referring to FIG. 3, as disclosed above, the mounting plate 108 and the outer cover plate 112 of the die machine 100 together form a housing for receiving and retaining the rotating nozzle assemblies 10 and other components of the die machine 100. During installation of the nozzle assembly 10 in the die machine 100, the stationary-sleeve second end 22 is pressed into the mounting plate opening 110 such that the stationary-sleeve second-end annular stepped seating surface 32 engages the corresponding mounting-plate annular stepped recess 114 fixedly attaching the stationary sleeve 12 to the mounting plate 108 of the die machine 100. The nozzle first end 40 extending beyond the nozzle-cap first end 48 engages and is rotatably driven by a tubular drive sleeve 116 which is rotatably mounted around the stationary-sleeve outer surface 36 and the nozzle-cap outer surface 56.

Desirably, the nozzle first end 40 extending beyond the nozzle-cap first end 48 has a generally polygon-like shape and the tubular drive-sleeve first end 118 engaging the nozzle first end 40 has a complimentary polygon-like shape. Preferably, the nozzle first end 40 has a hexagonal shape and the tubular drive-sleeve first end 118 has a corresponding hexagonal shape. Those skilled in the art will recognize that the manner in which the nozzle-cap first end 48 engages the tubular drive-sleeve first end 118 could be any other suitable form or shape which locks together the rotatable nozzle 14 and the drive sleeve 116 for concurrent rotation.

The drive-sleeve inside surface 120 contacts each of the outwardly-protruding annular stationary-sleeve ridges 38 to form two stationary-sleeve seals 58. The nozzle drive gear 106 is fixedly mounted (preferably with a press or keyed fit) on the drive-sleeve outer surface 122. The drive sleeve 116 is rotatably supported by two sets of drive-sleeve bearings 124 which are pressed into the mounting plate 108 and cover 112, respectively on both sides of the drive gear 106.

A pair of drive-sleeve bearing seal assemblies 126 are located on the axial outer sides of each of the drive-sleeve bearings 124 to prevent the ingress of dough or other material into the bearings 124 and to prevent lubricants in the gear area and/or bearings 124 from leaking outwardly. Each drive-sleeve bearing seal assembly 126 comprises a drive-sleeve-bearing annular seal ring 128 which faces or abuts a respective drive-sleeve bearing 124 within a drive-sleeve-bearing annular seal gland 128 within the mounting plate 108 or outer cover plate 112, a drive-sleeve-bearing inner-cover back-up ring 130 which abuts the drive-sleeve-bearing annular seal ring 128, and a drive-sleeve-bearing outer cover ring 132 which abuts and contains the drive-sleeve-bearing inner-cover back-up ring 130. The drive-sleeve-bearing annular seal ring 128 is generally C-shaped in cross-section and is preferably made of a soft elastomeric material such as those well known in the seal art. The drive-sleeve-bearing inner-cover back-up ring 130 is made of a high strength polymeric material such as polyether ether ketone (PEEK) or some other such material well known in the seal art. The drive-sleeve-bearing outer cover ring 132 is preferably made of metal, such as a steel alloy, and includes an annular lip which engages a complimentary lip on the drive-sleeve-bearing inner-cover back-up ring 130 to retain the drive-sleeve-bearing inner-cover back-up ring 130 in place, as shown on FIG. 3. The drive-sleeve-bearing outer cover ring 132 is held in place within an annular recess in the mounting plate 108 or outer cover plate 112 by a press or interference fit. In this manner the drive sleeve 116 rotates with respect to the sealing surfaces of the drive-sleeve-bearing annular seal ring 128 and the drive-sleeve-bearing inner-cover back-up ring 130.

Preferably, the stationary sleeve 12, the rotatable nozzle 14 and the drive sleeve 116 are all made of a food safe, high strength polymeric material to further reduce friction created as the dough is extruded. However, other suitable food sanitary materials, such as stainless steel, may be utilized if desired. Preferably the mounting plate 108, outer cover plate 112 and the drive gears 106 are each made of a high strength metal such as steel. The drive-sleeve bearings 124 are preferably ball or roller bearings and are of a type well known in the art.

The rotating nozzle assemblies 12 as shown include three separate stages of sealing for the rotating parts to prevent the ingress of dough into the gear area. The first stage seal is provided by the rotary contact between the ring seal 18 and the stationary-sleeve first-end annular stepped seating surface and by the rotary contact between the ring seal 18 and the outwardly-protruding annular nozzle ring 44.

The second stage seal has multiple, spaced apart seal areas provided by the two stationary-sleeve outwardly-protruding annular ridges 38 which contact and engage the drive-sleeve inside surface 120. The number of second stage seals may be varied to provide additional sealing effectiveness, if necessary by adding additional stationary-sleeve outwardly-protruding annular ridges 38.

The third stage seal is established by the drive-sleeve-bearing seal assemblies 126 which generally are unlikely to be reached by the dough stream. The drive-sleeve-bearing seal assemblies 126 also act as a good seal to prevent lubricants from the gear area and the drive-sleeve bearings 124 from moving back toward the dough area.

The three stage seal arrangement of the rotating nozzle rotary nozzle extruder die machine 10 provides increased reliability and solves the problems of past conventional seal designs in which dough would bypass the known mechanical seals and work into the gear box, requiring shut down and rebuilding of the equipment.

In use, dough is loaded into the extruder and forced into the mounting plate openings 110 and into the rotary nozzle die machine 100. The dough enters the rotating nozzle assemblies 10 which are driven via the motor 102 acting on the nozzle drive gears 106 through the gear drive assembly 104. The dough is forced through the nozzle openings 46 in each of the nozzles 14 as a plurality of dough strands that are spiral wound, twisted or braided, preferably from two or more dough strands. The spiral wound dough from each nozzle 14 is deposited on a conveyor, is cut into segments or pieces using a standard guillotine cutter (not shown), and is then proofed and baked. The proofing and baking steps are dependent upon the particular dough mixture, conveyor speed, room temperature, oven temperature, as well as other factors, and accordingly is not be described in detail herein. The resulting product may be produced as a laminated spiral stick or nugget or as a flat cracker, the round spiral cross-section having been flattened, for example, by a roller (not shown) to produce the cross-section associated with flat crackers.

The number, shape, and design of the nozzle openings 46 are specific to the type of dough and the process. When distinct nozzle openings 46 are created in the nozzle first end 40 such that the dough strands extruding from each of the holes are separate, the product forms a laminated type of bond when two or more nozzle openings 46 are provided. This creates a uniqueness in product texture. As the multiple strands of dough are extruded, the surface of each strand has a chance to dry before the action of the rotating nozzle 14 causes the strands to bond together. The drying of the surface of each strand creates a skin on the individual dough strands that helps to create the texture gradient in the resulting product. The faster the nozzles 14 are rotated, the more of a textural gradient is created. The speed of rotation of the nozzles 14 can be controlled by the variable speed motor 102. Similar products can be formed using a single opening 46 with, for example, a star-shaped design or other exaggerated radial features that, when wound, create the appearance of multiple strands.

Surface texture is also a function of nozzle opening design. The design of the opening(s) 46 must account for the open area of the product extruded and the length of the shape machined in the opening(s) 46 of the nozzle 14. The depth of the machining, sometimes referred to as the "land" area is critical to forming a laminar flow within the dough. If the dough does not achieve a laminar flow, the dough tends to peel back at the nozzle exit, ruining the product's surface texture. This is important when trying to rotary bond one dough strand to another. The land depth is typically at least as long as the width or diameter of the opening of the shape cut or machined on the nozzle end.

It will be appreciated by those skilled in the art that changes can be made to the embodiments described above without departing from the broad inventive concept of the invention. It will be similarly understood that the rotary nozzle die can be used in other food applications. It is understood, therefore, that this invention is not limited to the particular embodiments disclosed, but it is intended to cover modifications within the spirit and scope of the present invention.

We claim:

1. A rotating nozzle assembly for a die machine used in conjunction with a dough extruder, the die machine having a nozzle mounting plate, the nozzle assembly comprising:
    a stationary sleeve having a stationary-sleeve first end with a stationary-sleeve first-end internal annular recess, a stationary-sleeve first-end external annular recess, a stationary-sleeve first-end annular stepped seating surface and a stationary-sleeve second end mountable in the die machine mounting plate;
    a nozzle having a nozzle first end and a nozzle second end, a radially outwardly-protruding annular nozzle ring between the nozzle first end and the nozzle second end, the nozzle second end rotatably disposed in the stationary-sleeve first-end internal annular recess;
    a ring seal in contact with the stationary-sleeve first-end annular stepped seating surface and the radially outwardly-protruding annular nozzle ring;
    a nozzle cap having a nozzle-cap first end and a nozzle-cap second end, the nozzle cap fixedly attached to the stationary-sleeve first end, the nozzle rotatably disposed in the nozzle cap, the nozzle first end extending beyond the nozzle cap; and
    an annular stepped axial thrust bearing surface in the nozzle cap in contact with the radially outwardly-protruding annular nozzle ring preventing relative axial movement of the nozzle while allowing rotation of the nozzle.

2. The rotating nozzle assembly of claim 1, wherein the stationary-sleeve second end has an infeed cone.

3. The rotating nozzle assembly of claim 1, wherein the stationary sleeve has a stationary-sleeve outer surface with two spaced-apart outwardly-protruding stationary-sleeve annular ridges.

4. The rotating nozzle assembly of claim 1, wherein the nozzle has at least two circular nozzle openings.

5. The rotating nozzle assembly of claim 1, wherein the nozzle first end extending beyond the nozzle cap has a polygon-like shape.

6. A rotary-drive-nozzle die machine for use in conjunction with a dough forming extruder for extruding dough, the rotary drive nozzle machine comprising:
    a mounting plate having a mounting-plate opening configured to receive dough from the dough extruder;
    a outer cover plate forming, in conjunction with the mounting plate, a die machine housing;
    the rotating nozzle assembly according to claim 1 disposed in the die machine housing and mounted to the mounting plate; and
    a drive sleeve disposed in the housing, the drive sleeve rotatably mounted around the stationary sleeve and the nozzle cap of the rotating nozzle assembly and fixedly attached to the nozzle of the rotating nozzle assembly for rotation therewith and operatively coupled to a motor for rotation thereby.

7. The rotary-drive-nozzle die machine according to claim 6, wherein the nozzle of the rotating nozzle assembly has a nozzle first end with a hexagonal shape and extends beyond the nozzle cap, and the drive sleeve has a drive-sleeve first end with a corresponding hexagonal shape engaging the nozzle first end.

8. The rotary-drive-nozzle die machine according to claim 6, wherein the rotary drive nozzle has a first stage seal provided by the rotary contact between the ring seal and the stationary-sleeve first-end annular stepped seating surface and by the rotary contact between the ring seal and the outwardly-protruding annular nozzle ring.

9. The rotary-drive-nozzle die machine according to claim 6, wherein the rotary drive nozzle has a second stage seal provided by the stationary-sleeve outwardly-protruding annular ridge which contacts and engages a drive-sleeve inside surface.

10. The rotary-drive-nozzle die machine according to claim 6, wherein the drive sleeve is rotatably supported by a pair of drive-sleeve bearings and a pair of drive-sleeve bearing seal assemblies located on an axial outer side of each of the drive-sleeve bearings 124 prevent an ingress of dough into the bearings 124 and prevent lubricants in the bearings from leaking outwardly.

* * * * *